(12) United States Patent
Ogle et al.

(10) Patent No.: US 10,138,414 B2
(45) Date of Patent: Nov. 27, 2018

(54) PROPPING SUBTERRANEAN FORMATION FRACTURES USING MEMORY PARTICULATES

(71) Applicant: Halliburton Energy Services, Inc., Houston, TX (US)

(72) Inventors: James William Ogle, Spring, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 107 days.

(21) Appl. No.: 15/104,685

(22) PCT Filed: Feb. 24, 2014

(86) PCT No.: PCT/US2014/017910
§ 371 (c)(1),
(2) Date: Jun. 15, 2016

(87) PCT Pub. No.: WO2015/126419
PCT Pub. Date: Aug. 27, 2015

(65) Prior Publication Data
US 2016/0312112 A1  Oct. 27, 2016

(51) Int. Cl.
*E21B 43/26* (2006.01)
*E21B 43/267* (2006.01)
(Continued)

(52) U.S. Cl.
CPC ............... *C09K 8/80* (2013.01); *C09K 8/601* (2013.01); *C09K 8/805* (2013.01); *E21B 43/26* (2013.01); *E21B 43/267* (2013.01)

(58) Field of Classification Search
None
See application file for complete search history.

(56) References Cited

U.S. PATENT DOCUMENTS 3,316,965 A * 5/1967 Watanabe ............. C09K 8/516
166/280.1
6,109,350 A    8/2000 Nguyen et al.
(Continued)

FOREIGN PATENT DOCUMENTS

EP    2469020 A1    6/2012
WO   2015126419 A1   8/2015

OTHER PUBLICATIONS

Lai et al., "Shape Memory and Superelastic Ceramics at Small Scales," Science, 341, 37/09/2013, pp. 1505-1508, 2013.
(Continued)

*Primary Examiner* — William D Hutton, Jr.
*Assistant Examiner* — Charles R Nold
(74) *Attorney, Agent, or Firm* — McGuireWoods LLP

(57) ABSTRACT

Methods including providing memory particulates having a compressed configuration and a decompressed configuration; providing a treatment fluid comprising a treatment base fluid and memory particulates in a configuration; introducing the treatment fluid into a subterranean formation comprising at least one fracture therein, so as to place the memory particulates in the at least one fracture in their compressed configuration; and expanding the memory particulates to the decompressed configuration, thereby mechanically interlocking the memory particulates and propping open at least a portion of the at least one fracture.

16 Claims, 1 Drawing Sheet

(51) Int. Cl.
*C09K 8/80* (2006.01)
*C09K 8/60* (2006.01)

(56) References Cited

U.S. PATENT DOCUMENTS

| | | | |
|---|---|---|---|
| 7,192,496 B2 * | 3/2007 | Wojcik | C22C 19/007 |
| | | | 148/669 |
| 2007/0027036 A1 | 2/2007 | Polizzotti et al. | |
| 2008/0017376 A1 | 1/2008 | Badalamenti et al. | |
| 2009/0120647 A1 | 5/2009 | Turick et al. | |
| 2009/0176667 A1 | 7/2009 | Nguyen | |
| 2009/0205826 A1 | 8/2009 | Rodriguez | |
| 2009/0294126 A1 | 12/2009 | Dalrymple et al. | |
| 2010/0067868 A1 | 3/2010 | Moore | |
| 2010/0089581 A1 | 4/2010 | Nguyen et al. | |
| 2010/0147507 A1 | 6/2010 | Korte et al. | |
| 2010/0314115 A1 | 12/2010 | Moradi-Araghi et al. | |
| 2011/0048720 A1 | 3/2011 | Diaz et al. | |
| 2011/0193291 A1 | 8/2011 | Schilte et al. | |
| 2012/0181023 A1 * | 7/2012 | Guerrero | E21B 43/025 |
| | | | 166/276 |
| 2013/0062061 A1 * | 3/2013 | Taylor | E03B 3/18 |
| | | | 166/288 |
| 2013/0067907 A1 * | 3/2013 | Greene | C22F 1/10 |
| | | | 60/527 |
| 2014/0020893 A1 | 1/2014 | Smith et al. | |
| 2014/0251621 A1 * | 9/2014 | Smith | E21B 7/062 |
| | | | 166/305.1 |
| 2015/0021022 A1 * | 1/2015 | Ladva | C09K 8/805 |
| | | | 166/276 |

OTHER PUBLICATIONS

International Search Report and Written Opinion for PCT/US2014/017910 dated Nov. 24, 2014.

* cited by examiner

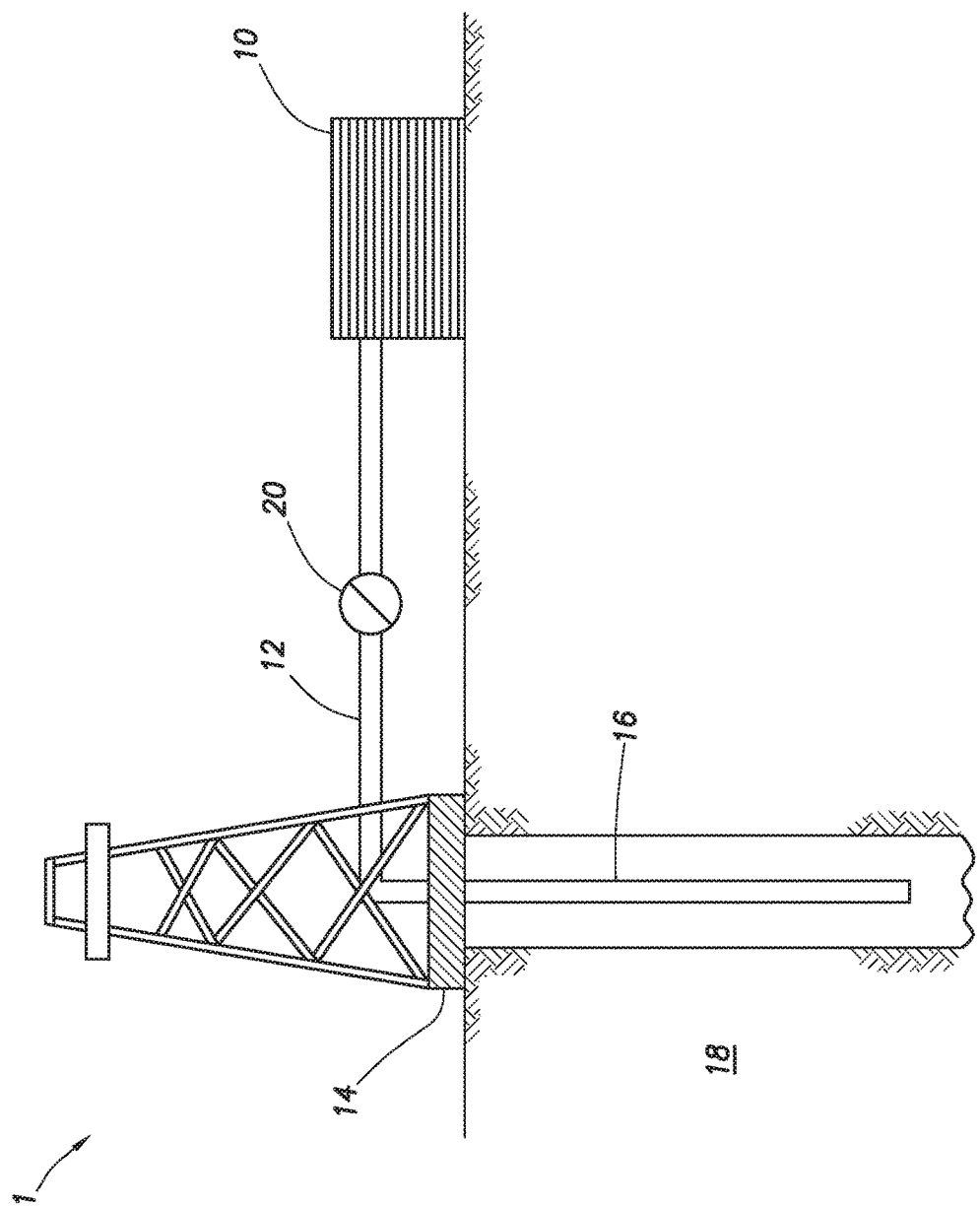

PROPPING SUBTERRANEAN FORMATION FRACTURES USING MEMORY PARTICULATES

BACKGROUND

The embodiments herein relate to propping fractures in subterranean formations and, more particularly, to propping fractures in subterranean formations using memory particulates.

Subterranean wells (e.g., hydrocarbon producing wells, water producing wells, and the like) are often stimulated by hydraulic fracturing treatments. In hydraulic fracturing treatments, a viscous treatment fluid is pumped into a portion of a subterranean formation at a rate and pressure such that the subterranean formation breaks down and one or more fractures are formed therein. Particulate solids, such as graded sand, are typically suspended in at least a portion of the treatment fluid and deposited into the fractures in the subterranean formation. These particulate solids, or "proppants particulates" (also referred to simply as "proppants") serve to prop the fracture open (e.g., keep the fracture from fully closing) after the hydraulic pressure is removed. By keeping the fracture from fully closing, the proppant particulates aid in forming conductive paths through which produced fluids, such as hydrocarbons, may flow.

The degree of success of a fracturing operation depends, at least in part, upon fracture porosity and conductivity once the fracturing operation is complete and production is begun. Traditional fracturing operations place a volume of proppant into a fracture to form a "proppant pack" in order to ensure that the fracture does not close completely upon removing the hydraulic pressure. The ability of the proppants to maintain a fracture open depends upon the ability of the proppant to withstand fracture closure pressures. The porosity of a proppant pack within a fracture is related to the interconnected interstitial spaces between abutting proppants. Thus, the fracture productivity is closely related to the strength of the placed proppant particulates and the interstitial spaces between the proppant particulates in the proppant pack.

In some fracturing operations, a large volume of proppant particulates may be placed within the fracture to form a tight proppant pack. In other fracturing operations, a much reduced volume of proppant particulates may be placed in the fracture to create larger interstitial spaces between the proppant particulates. However, both fracturing approaches may result in at least some settling of the proppants within a fracture opening. Proppant settling may lead to a fracture or a top portion of a fracture closing, which may lower the conductivity of the proppant fracture and result in proppant masses having little or no interstitial spaces at the bottom portion of a fracture, thereby further decreasing the conductivity of the fracture. Proppant settling may be particularly problematic in cases where proppant aggregates are used in place of traditional proppant particulates because the proppant aggregates tend to be larger and may be heavier and, thus, more difficult to hold in suspension. While settling may be counteracted by using a high pump rate or by increasing the viscosity of the fluid carrying the proppant particulates or proppant aggregates, such methods often lose effectiveness once the fluid comprising the proppant or aggregates is placed into a fracture and before the hydraulic pressure is released.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids of the embodiments described herein to a downhole location.

DETAILED DESCRIPTION

The embodiments herein relate to propping fractures in subterranean formations and, more particularly, to propping fractures in subterranean formations using memory particulates. Specifically, the embodiments herein relate to memory particulates capable of propping fractures in a subterranean formation that may be placed in the fracture in a compressed state and thereafter are decompressed to mechanically lock the memory particulates and/or other particulates in the fracture, thereby eliminating or reducing settling and enhancing fracture conductivity. The embodiments herein thus rely on mechanical interlocking mechanisms for enhancing fracture conductivity, rather than traditional chemical adhesion mechanisms traditionally relied upon, although both may be used together, without departing from the scope of the present disclosure.

Although some embodiments described herein are illustrated by reference to hydraulic fracturing treatments, the memory particulates disclosed herein may be used in any subterranean formation operation that may benefit from their compressed and decompressed configuration properties. Such treatment operations may include, but are not limited to, a drilling operation; a stimulation operation; an acidizing operation; an acid-fracturing operation; a sand control operation; a fracturing operation; a frac-packing operation; a remedial operation; and any combination thereof.

Moreover, the memory particulates described herein may be used in any non-subterranean operation that may benefit from their compressed and decompressed configuration properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a method of providing a treatment fluid comprising a treatment base fluid and memory particulates, wherein the memory particulates have a compressed configuration and a decompressed configuration. The memory particulates are initially in their compressed configuration in the treatment fluid. The treatment fluid comprising the compressed memory particulates may then be introduced into a subterranean formation comprising at least one fracture therein, such that the compressed memory particulates are placed into the at least one fracture. After their placement, the compressed memory particulates expand and adopt their decompressed configuration, thereby mechanically interlocking themselves into place in the fracture and propping the fracture open. The ability of the memory particulates to enlarge from their compressed configuration and into their decompressed configuration after placement in the fracture may also prevent or substantially reduce any settling in the fracture, thereby further contributing to the conductivity of the fracture.

In other embodiments, the present disclosure provides a method comprising providing a substantially solids-free spacer fluid comprising a spacer base fluid and providing a treatment fluid comprising a treatment base fluid and memory particulates, wherein the memory particulates have a compressed configuration and a decompressed configuration. The memory particulates are in their compressed configuration in the treatment fluid. The treatment fluid comprising the compressed memory particulates and the spacer fluid may be introduced into a subterranean formation comprising at least one fracture therein, so as to alternate the compressed memory particulates and the spacer fluid within the at least one fracture. After placement, the compressed memory particulates expand and adopt their decompressed configuration, thereby mechanically interlocking themselves into place in the fracture and propping the fracture open. Voids are formed between a plurality of the decompressed memory particulates, where the spacer fluid was pumped between the treatment fluid, thereby increasing the conductivity of the fracture (i.e., produced fluids may flow not only through the interstitial spaces between the memory particulates, but also through the voids formed by intermittently pumping the treatment fluid and the spacer fluid).

In some embodiments, a pad fluid may be first introduced into the subterranean formation at a rate and pressure sufficient to create the at least one fracture in the formation. In other embodiments, the spacer fluid itself may be used to create the at least one fracture in the formation, or enhance the at least one fracture after its formation (e.g., by the pad fluid or by other means).

The memory particulates for use in the present disclosure may be any material capable of compressing in size and thereafter decompressing (i.e., expanding) under downhole conditions or upon exposure to a particular downhole stimulant (e.g., a chemical, downhole temperatures, or other downhole conditions such as pH or salinity, and the like) and which does not degrade in subterranean formation environments, at least over a prolonged period of time (e.g., the lifetime of a wellbore). Typically, the decompressed configuration of the memory particulate is the form of the particulate in its most expanded state, and the compressed configuration is at least at a reduced size compared to the decompressed size, often substantially so. In some embodiments, the compressed configuration of the memory particulates described herein may have a volume in the range of a lower limit of about 50%, 75%, 100%, 125%, 150%, 175%, 200%, 225%, 250%, 275%, 300%, 325%, 350%, 375%, 400%, 425%, and 450% to an upper limit of about 1000%, 975%, 950%, 925%, 900%, 875%, 850%, 825%, 800%, 775%, 750%, 725%, 700%, 675%, 650%, 625%, 600%, 575%, 550%, 525%, 500%, 475%, and 450% less than the volume of the memory particulates in the decompressed configuration. The amount of compression may depend on a number of factors including, but not limited to, the type of stimulant that causes the memory particulate to compress, the amount of stimulant that causes the memory particulate to compress that is exposed to the memory particulate, and the like.

In some embodiments, the memory particulates may fluctuate from their compressed configuration and decompressed configuration multiple times, depending on their exposure to particular stimuli. That is, in some embodiments, any memory particulates that are not placed in the fracture and flowed back to the surface may be reused in the same formation or in a different formation, or in a different application altogether. That is, the compressed configuration and the decompressed configuration of the memory particulates are both reversible, in at least some embodiments of the present disclosure. Such may be particularly true if the memory particulate is stimulated to compress or decompress based on a chemical or surfactant stimuli, for example. In other embodiments, the memory particulates for use in the embodiments herein, may expand to their decompressed configuration and may not thereafter re-compress.

In some embodiments herein, the memory particulate is able to convert from its compressed configuration to its decompressed configuration due to temperature changes. In particular, a memory particulate according to one or more embodiments of the present disclosure, may adopt its compressed configuration at temperatures that are less than downhole formation temperatures, which generally are equal to or exceed about 45° C. (about 113° F.). In some embodiments, the memory particulate may adopt its compressed configuration at temperatures such as ambient temperature (about 20° C. (about 68° F.) or typical outside temperatures (e.g., those at a well site), which may facilitate easy preparation of the treatment fluids of the present disclosure that comprise the memory particulates in their compressed configuration. The temperature dependent memory particulates may adopt their decompressed configuration at temperatures encountered in subterranean formations, such as those equal to or exceeding about 45° C. (about 113° F.). Such memory particulates decompress but do not degrade at these temperatures, as the memory particulates herein are non-degradable, at least over the lifetime of the wellbore, so as to ensure that the fractures in the formation remain conducive to the flow of produced fluids.

The temperature dependent memory particulates described herein may allow the particulates to lock in place in the fracture without the need of exposing the memory particulates to a secondary chemical or fluid flush to convert them into their decompressed configuration.

Suitable memory particulates for use in the present disclosure may include, but are not limited to, a martensitic ceramics (which may also be referred to as a ceramic having undergone martensitic transformation, or "superelastic ceramics"). As used herein, the term "martensitic," and all of its variants (e.g., "martensite"), refers to a material having a crystal structure that is formed by diffusionless transformation, typically a hard form of a steel crystalline structure. As used herein, the term "diffusionless transformation" refers to a phase change that occurs without the long-range diffusion of atoms, but instead by some form of cooperative, homogeneous movement of a relatively high number of atoms resulting in a change in crystal structure. While memory particulates for use in the present disclosure may comprise martensitic ceramics along with other components, in some embodiments, the memory particulates consist essentially of martensitic ceramics. In still other embodiments, the martensitic ceramics consist solely of martensitic ceramics.

The ceramics for use in forming the martensitic ceramics disclosed herein may include, but are not limited to, an oxide ceramic, a boride ceramic, a nitride ceramic, a silicate ceramic, and any combination thereof. Suitable oxide ceramics may include, but are not limited to, silicon oxide, silicon dioxide, aluminum oxide, aluminum titanate, beryllium oxide, zirconium oxide, magnesium oxide, titanium dioxide, dioxides thereof (e.g., zirconium dioxide), and any combination thereof (e.g., aluminum oxide reinforced with zirconium oxide). Suitable boride ceramics may include, but are not limited to, titanium diboride, zirconium diboride, hafnium diboride, and any combination thereof. Suitable nitride ceramics may include, but are not limited to, silicon nitride, aluminum nitride, boron nitride, titanium nitride, zirconium nitride, vanadium nitride, niobium nitride, tantalum nitride, hafnium nitride, and any combination thereof. Suitable silicate ceramics may include, but are not limited to, porcelain, steatite, cordierite, mullite, and any combination thereof. In some embodiments, zirconium dioxide may be a preferred martensitic ceramic for use in forming the memory particulates. The ceramics used for forming the martensitic ceramics may further be stabilized, such as with, for example, ceria, yttria, and any combination thereof.

In some embodiments, at least a portion of the memory particulates described herein may comprise a superelastic alloy. The superelastic alloy may further act to enhance the compression and decompression properties of the memory particulates described herein. In some embodiments, the superelastic alloy may be deposited within the martensitic ceramic (e.g., like an emulsion where the continuous phase is the martensitic ceramic and the superelastic alloy is the discontinuous phase). In other embodiments, the martensitic ceramic may be deposited within the superelastic alloy (e.g., like an emulsion where the continuous phase is the superelastic alloy and the discontinuous phase is the martensitic ceramic). In yet other embodiments, the superelastic alloy may coat the martensitic ceramic or the martensitic ceramic may coat the superelastic alloy. Suitable superelastic alloys may comprise one or more of the following metallic elements: nickel, titanium, copper, aluminum, zinc, manganese, silicon, gold, iron, cobalt, vanadium, and chromium. Examples of specific superelastic alloys that may be used as the memory particulates of the present disclosure may include, but are not limited to, a nickel-titanium alloy, a copper-aluminum-nickel alloy, a copper-zinc-aluminum alloy, an iron-manganese-silicon alloy, a nickel-titanium-cobalt alloy, a nickel-titanium-copper alloy, a nickel-titanium-vanadium alloy, a nickel-titanium-chromium alloy, and any combination thereof. In preferred embodiments, the superelastic alloy is selected from the group consisting of a nickel-titanium alloy, a nickel-titanium-copper alloy, a nickle-titanium-vanadium alloy, a nickel-titanium-chromium alloy, and any combination thereof. In some embodiments, the superelastic alloy may form a portion of the memory particulate in the range of from a lower limit of about 10%, 15%, 20, 25%, 30%, 35%, 40%, 45%, and 50% to an upper limit about 90%, 85%, 80%, 75%, 70%, 65%, 60%, 55%, and 50% of the memory particulate.

In some embodiments, at least a portion of the memory particulates comprises a swellable elastomer. The swellable elastomer may further act to enhance the compression and decompression properties of the memory particulates described herein. In some embodiments, the swellable elastomer may be deposited within the martensitic ceramic (e.g., like an emulsion where the continuous phase is the martensitic ceramic and the swellable elastomer is the discontinuous phase). In other embodiments, the martensitic ceramic may be deposited within the swellable elastomer (e.g., like an emulsion where the continuous phase is the swellable elastomer and the discontinuous phase is the martensitic ceramic). In yet other embodiments, the swellable elastomer may coat the martensitic ceramic or the martensitic ceramic may coat the swellable elastomer.

Suitable swellable elastomers may be any material capable of pliability when exposed to stress. Examples of suitable swellable elastomers that may form a portion of the memory particulates of the present disclosure may include, but are not limited to, a cross-linked polyacrylamide; a cross-linked polyacrylate; a cross-linked copolymer of acrylamide and acrylate monomers; a starch grafted with acrylonitrile and acrylate; a cross-linked polymer of two or more of allylsulfonates; a 2-acrylamido-2-methyl-1-propanesulfonic acid; a 3-allyloxy-2-hydroxy-1-propanesulfonic acid; an acrylamide; an acrylic acid monomer; a salt of a carboxyl starch; a salt of a carboxymethyl starch; a salt of carboxymethyl cellulose; a salt of cross-linked carboxyalkyl polysaccharide; a natural rubber; an acrylate butadiene rubber; a polyacrylate rubber; an isoprene rubber; a chloroprene rubber; a butyl rubber; a brominated butyl rubber; a chlorinated butyl rubber; a chlorinated polyethylene; a neoprene rubber; a styrene butadiene copolymer rubber, a sulphonated polyethylene; an ethylene acrylate rubber; an epichlorohydrin ethylene oxide copolymer; an ethylene-propylene rubber; an ethylene-propylene-diene terpolymer rubber; an ethylene vinyl acetate copolymer; a fluorosilicone rubber; a silicone rubber; a fluoro rubber; a poly 2,2,1-bicyclo heptane; an alkylstyrene; a crosslinked substituted vinyl acrylate copolymer; diatomaceous earth; and any combination thereof.

The type and amount of swellable elastomer to include as at least a portion of the memory particulates, when used, will depend on a number of factors including, but not limited to, the type of martensitic ceramic selected for the memory particulate, the size of the memory particulate, the conditions of the subterranean formation into which the memory particulates are to be placed, and the like. One of skill in the art, with the benefit of this disclosure, will recognize the type and amount of swellable elastomer to include, if any, in the memory particulates described herein. In some embodiments, the swellable elastomer may form a portion of the memory particulate in the range of from a lower limit of about 10%, 15%, 20, 25%, 30%, 35%, 40%, 45%, and 50% to an upper limit about 90%, 85%, 80%, 75%, 70%, 65%, 60%, 55%, and 50% of the memory particulate.

In some embodiments, at least a portion of the memory particulates may comprise both a superelastic alloy and a swellable elastomer. In such embodiments, the combined superelastic alloy and swellable elastomer may form a portion of the memory particulate in the range of from a lower limit of about 10%, 15%, 20, 25%, 30%, 35%, 40%, 45%, and 50% to an upper limit about 90%, 85%, 80%, 75%, 70%, 65%, 60%, 55%, and 50% of the memory particulate.

The memory particulates of the present disclosure may be of any size and shape combination known in the art as suitable for use in a fracturing operation. Generally, where the chosen memory particulates are substantially spherical, suitable sizes range from a lower limit of about 2 mesh, 20 mesh, 40 mesh, 60 mesh, 80 mesh, 100 mesh, 120 mesh, 140 mesh, 160 mesh, 180 mesh, and 200 mesh to an upper limit of about 400 mesh, 380 mesh, 360 mesh, 340 mesh, 320 mesh, 300 mesh, 280 mesh, 260 mesh, 240 mesh, 220 mesh, and 200 mesh, U.S. Sieve Series. In other embodiments, the memory particulates may be larger in size than 400 mesh, U.S. Sieve Series. In some embodiments, the memory particulates have a size in the range of from about 8 to about 120 mesh, U.S. Sieve Series. A major advantage of using this method is there is no need for the memory particulates to be sieved or screened to a particular or specific particle mesh size or particular particle size distribution, but rather a wide or broad particle size distribution can be used.

In some embodiments, it may be desirable to use substantially non-spherical memory particulates. Suitable substantially non-spherical memory particulates may be cubic, polygonal, fibrous, or any other non-spherical shape. Such substantially non-spherical memory particulates may be, for example, cubic-shaped, rectangular-shaped, rod-shaped, ellipse-shaped, cone-shaped, pyramid-shaped, or cylinder-shaped. That is, in embodiments wherein the memory particulates are substantially non-spherical, the aspect ratio of the material may range such that the material is fibrous to such that it is cubic, octagonal, or any other configuration. Substantially non-spherical memory particulates are generally sized such that the longest axis is from about 0.02 inches to about 0.3 inches in length. In other embodiments, the longest axis is from about 0.05 inches to about 0.2 inches in length. In one embodiment, the substantially non-spherical memory particulates are cylindrical having an aspect ratio of about 1.5 to 1 and about 0.08 inches in diameter and about 0.12 inches in length. In another embodiment, the substantially non-spherical memory particulates are cubic having sides about 0.08 inches in length. The use of substantially non-spherical memory particulates may be desirable in some embodiments because, among other things, they may provide a lower rate of settling when slurried into a fluid.

In some embodiments, the memory particulates may be introduced as aggregates. As used herein, the term "aggregates," and all of its variants (e.g., "memory particulate aggregates," "proppant aggregates," and the like) refer to a coherent body of particulates that does not generally become dispersed into smaller bodies without the application of shear. As used herein, unless otherwise explicitly stated, the term "memory particulates" is intended to encompass both single memory particulates and memory particulate aggregates. The aggregates may be formed, for example, by coating at least a portion of the memory particulates with a stabilizing agent to facilitate binding the individual memory particulates together such that they do not generally disperse in the presence of shear. In other embodiments, the stabilizing agent may be included in the treatment fluid and may interact with the memory particulates and coat at least a portion of the memory particulates by being included therein.

Suitable stabilizing agents for use in the present disclosure may include, but are not limited to, a non-aqueous tackifying agent; an aqueous tackifying agent; a silyl-modified polyamide compound; a binder; a curable resin composition (e.g., a composition capable of curing to form hardened substance); and any combination thereof. Stabilizing agents may be applied on-the-fly by including the stabilizing agent in the treatment fluid at the well site, directly prior to pumping the treatment fluid into the formation, or may be applied to coat the memory particulates at the well site, directly before including them into the treatment fluid to be pumped into the formation. As used herein, the term "on-the-fly" refers to performing an operation during a subterranean treatment that does not require stopping normal operations.

Non-aqueous tackifying agents suitable for use in the treatment fluids of the present disclosure may comprise any compound that, when in liquid form or in a solvent solution, will form a non-hardening coating upon a particulate. A particularly preferred group of non-aqueous tackifying agents may comprise polyamides that are liquids or in solution at the temperature of the subterranean formation such that they are, by themselves, non-hardening when introduced into the subterranean formation. A particularly preferred product may be a condensation reaction product comprised of polyacid(s) and a polyamine. Such products may include compounds such as mixtures of $C_{36}$ dibasic acids containing some trimer and higher oligomers and also small amounts of monomer acids that are reacted with polyamines. Other polyacids may include trimer acids, synthetic acids produced from fatty acids, maleic anhydride, acrylic acid, and the like. Additional compounds which may be used as non-aqueous tackifying agents may include liquids and solutions of, for example, polyesters, polycarbonates and polycarbamates, natural resins such as shellac, and the like.

Non-aqueous tackifying agents suitable for use in the embodiments disclosed herein may be used such that they form a non-hardened coating, or may be combined with a multifunctional material capable of reacting with the non-aqueous tackifying compound to form a hardened coating. A "hardened coating" as used herein means that the reaction of the non-aqueous tackifying agent with the multifunctional material will result in a substantially non-flowable reaction product that exhibits a higher compressive strength in a consolidated agglomerate than the non-aqueous tackifying agent alone. In this instance, the non-aqueous tackifying agent may function similarly to a hardenable resin. Multifunctional materials suitable for use in the present disclosure may include, but are not limited to, an aldehyde (e.g., formaldehyde); a dialdehyde (e.g., glutaraldehyde, hemiacetals or aldehyde releasing compounds); a diacid halide; a dihalide (e.g., dichlorides and dibromides); a polyacid anhydride (e.g., citric acid, epoxides, furfuraldehyde, glutaraldehyde or aldehyde condensates); and any combination thereof. In some embodiments, the multifunctional material may be mixed with the non-aqueous tackifying agent in an amount of from a lower limit of about 0.01%, 0.5%, 0.1%, 0.5%, 1%, 5%, 10%, and 15% to an upper limit of about 50%, 45%, 40%, 35%, 30%, 25%, 20%, and 15% by weight of the non-aqueous tackifying agent. In other embodiments, the multifunctional material may be mixed with the non-aqueous tackifying agent in an amount of from about 0.5% to about 1% by weight of the non-aqueous tackifying agent.

Solvents suitable for use with the non-aqueous tackifying agents may include any solvent that is compatible with the non-aqueous tackifying agent and achieves the desired viscosity effect. The solvents that can be used in the embodiments disclosure herein may preferably include those having high flash points (most preferably above about 125° F. (51.7° C.)). Examples of solvents suitable for use in the embodiments herein with the non-aqueous tackifying agents may include, but are not limited to, butylglycidyl ether; dipropylene glycol methyl ether; butyl bottom alcohol; dipropylene glycol dimethyl ether; diethyleneglycol methyl ether; ethyleneglycol butyl ether; methanol; butyl alcohol; isopropyl alcohol; diethyleneglycol butyl ether; propylene carbonate; d'limonene; 2-butoxy ethanol; butyl acetate; furfuryl acetate; butyl lactate; dimethyl sulfoxide; dimethyl formamide; fatty acid methyl ester; and any combination thereof. It is within the ability of one skilled in the art, with the benefit of this disclosure, to determine whether a solvent is needed to achieve a viscosity suitable to the subterranean conditions and, if so, how much.

Suitable aqueous tackifying agents for use as the stabilizing agent may be mixed in the treatment fluid or may be intentionally coated at least partially upon the surface of the memory particulates. Generally, suitable aqueous tackifying agents are not significantly tacky when mixed with or coated onto the memory particulates, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of the memory particulate to prepare it to be coated with an aqueous tackifying agent. Suitable aqueous tackifying agents may generally be charged polymers that comprise compounds that, when in an aqueous solvent or solution, will form a non-hardening coating (by itself or with an activator) and, when placed on the memory particulate, will increase the continuous critical re-suspension velocity thereof when contacted by a stream of aqueous fluid.

Examples of aqueous tackifying agents suitable for use in the embodiments herein may include, but are not limited to, an acrylic acid polymer; an acrylic acid ester polymer; an acrylic acid derivative polymer; an acrylic acid homopolymers; an acrylic acid ester homopolymer (e.g., poly(methyl acrylate), poly(butyl acrylate), and poly(2-ethylhexyl acrylate)); an acrylic acid ester co-polymer; a methacrylic acid derivative polymer; a methacrylic acid homopolymer; a methacrylic acid ester homopolymer (e.g., poly(methyl methacrylate), poly(butyl methacrylate), and poly(2-ethylhexyl methacrylate)); an acrylamido-methyl-propane sulfonate polymer; an acrylamido-methyl-propane sulfonate derivative polymer; an acrylamido-methyl-propane sulfonate copolymer; an acrylic acid/acrylamido-methyl-propane sulfonate copolymer; and any combination thereof.

Silyl-modified polyamide compound may be used as the stabilizing agent in some embodiments described herein. The silyl-modified polyamide compounds suitable for use as a stabilizing agent in the methods of the present disclosure may be described as substantially self-hardening compositions that are capable of at least partially adhering the memory particulates described herein in the unhardened state, and that are further capable of self-hardening into a substantially non-tacky state. Such silyl-modified polyamide compounds may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, the entire disclosure of which is herein incorporated by reference.

Binders suitable for use as the stabilizing agent of the embodiments described herein may generally comprise a heterocondensate of (1) a hydrolysable silicon compound having at least one non-hydrolysable organic radical without polymerizable group and (2) a metal and/or boron compound. Such binders may be prepared by hydrolyzing (1), above, with water; adding (2), above, to the resultant reaction mixture after the water in the reaction mixture is substantially consumed; and, optionally, adding an organic binder component to the heterocondensate and/or a precursor thereof.

In addition, binders suitable for use in the embodiments described herein may generally comprise 1) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf; 2) an organic polymerizable or polycondensable monomer or oligomer; and, 3) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. Such binders are suitable for consolidating bulk or loose substrates.

Other binders suitable for using the present disclosure may generally comprise:

(I) a consolidant comprising a hydrolyzate or precondensate of
(a) at least one organosilane of the general formula (I):

$$R_nSiX_{4-n} \quad (I)$$

in which the R radicals are the same or different and are each hydrolytically non-removable groups, the X radicals are the same or different and are each hydrolytically removable groups or hydroxyl groups and n is 1, 2 or 3, (b) optionally at least one hydrolyzable silane of the general formula (II)

$$SiX_4 \quad (II)$$

in which the X radicals are each as defined above, and (c) at least one metal compound of the general formula (III)

$$MX_a \quad (III)$$

in which M is a metal of main groups I to VIII or of transition groups II to VIII of the Periodic Table of the Elements including boron, X is as defined in formula (I), where two X groups may be replaced by one oxo group, and a corresponds to the valence of the element,
where the molar ratio of silicon compounds used to metal compounds used is in the range from 8000:1 to 8:1,
is infiltrated or injected into the geological formation and,
(II) the consolidant is cured under elevated pressure and elevated temperature, where the consolidant, in the case that it is used to change the wetting behavior of the formation, also comprises an oleophobic and hydrophobic component. Comprehensive investigations have shown that these consolidants are not decomposed even in autoclaves at high pressure and high temperature even over a prolonged period, and also still form a stable bond under these conditions. In the case of use of a wetting-regulating consolidation variant, it was shown that the wetting behavior established is retained after a hydrothermal treatment in corrosive medium. The consolidation also reduces the porosity only to a slight degree.

Curable resins suitable for use as the stabilizing agent in some embodiments described herein may be any resins known in the art that are capable of forming a hardened, consolidated mass. Some suitable curable resins may include, but are not limited to, a two component epoxy based resins; a novolak resin; a polyepoxide resin; a phenol-aldehyde resin; a urea-aldehyde resin; a urethane resin; a phenolic resin; a furan resin; a furan/furfuryl alcohol resin; a phenolic/latex resin; a phenol formaldehyde resin; a polyester resin; a polyester resin hybrid; a polyester resin copolymer; a polyurethane resin; a polyurethane resin hybrid; a polyurethane resin copolymer; an acrylate resin; a silicon-based resin; and any combination thereof. Some suitable curable resins, such as epoxy resins, may be cured with an internal catalyst or activator so that when pumped down hole, they may be cured using only time and temperature. Other suitable curable resins, such as furan resins generally require a time-delayed catalyst or an external catalyst to help activate the polymerization of the resins if the cure temperature is low (i.e., less than 250° F. (121.1° C.)), but will cure under the effect of time and temperature if the formation temperature is above about 250° F. (121.1° C.), preferably above about 300° F. (148.9° C.). It is within the ability of one skilled in the art, with the benefit of this disclosure, to select a suitable curable resin for use in embodiments described herein and to determine whether a catalyst is required to trigger curing.

Any solvent that is compatible with the curable resin and achieves the desired viscosity effect is suitable for use in the embodiments described herein. Preferred solvents include those listed above in connection with tackifying agents. It is within the ability of one skilled in the art, with the benefit of this disclosure, to determine whether and how much solvent is needed to achieve a suitable viscosity.

Generally, the stabilizing agent may be added in any amount capable of associating with the memory particulates in the treatment fluid to permit at least partial coating onto the memory particulates, or in an amount capable of being coated at least in part onto the memory particulates, so as to facilitate formation of aggregates. In some embodiments, the stabilizing agent may be present in an amount of from a lower limit of about 0.1%, 0.25%, 0.5%, 0.75%, 1%, 1.25%, 1.5%, 1.75%, 2%, 2.25%, and 2.5% to an upper limit of about 5%. 4.75%, 4.5%, 4.25%, 4%, 3.75%, 3.5%, 3.25%, 3%, 2.75%, and 2.5% by weight of the memory particulates.

In some embodiments, the memory particulates may be at least partially encased in a gel body, thereby forming a solids-laden gel body. The memory particulates may be wholly encased or may exist partially inside the gel body and partially outside the gel body. The gel bodies may further aid in suspending the memory particulates in the treatment fluid, and, in some embodiments, may aid in separating the memory particulates if aggregates are not desirable. In some embodiments, multiple memory particulates may be at least partially encased in a single gel body, thereby forming the aggregates described in some embodiments herein. In some embodiments, the gel bodies may degrade over time and, in other embodiments, the gel bodies may be substantially non-degradable.

In some embodiments, solids-free gel bodies may be included in the spacer fluid of the present invention. The solids-free gel bodies may weight the spacer fluid and may aid in ensuring that the treatment fluid and the spacer fluid do not mix when placed in the fracture, thus forming the voids between adjacent memory particulates to increase the conductivity of the fracture. The solids-free gel bodies may generally be any size or shape suitable for a memory particulate, as described herein. In some embodiments, the The gel bodies suitable for use in the embodiments described herein (both the solids-free gel bodies and the gel bodies that may encase a portion of the memory particulates) include those described in U.S. Patent Application No. 2010/0067868. The relevant disclosure of which is incorporated herein by reference in its entirety. In addition, the swellable elastomer discussed herein may be suitable for use as forming the gel bodies described herein. One of skill in the art will recognize that some of the gel bodies may be designed to degrade once the fracture closes, while other gel bodies may be more resistant to such degradation long after the closing of the fracture, or for the entire production life of the subterranean formation. In some instances, the solids-free gel bodies included in the spacer fluid may be preferably designed to degrade shortly after the hydraulic pressure is removed and a proppant pack is formed with the memory particulates described herein.

In some embodiments, the treatment fluid may further comprise either or both of non-degradable non-expandable particulates and degradable non-expandable particulates (referred to herein simply as "non-degradable particulates" and "degradable particulates," respectfully). In other embodiments, the aggregates may be formed of the memory particulates described herein and either or both of non-degradable particulates and degradable particulates. The non-degradable particulates, among other things, may provide additional rigidity to the proppant pack in a fracture after the hydraulic pressure is removed. The degradable particulates, among other things, may be included in the treatment fluid or as part of an aggregate to be placed in a fracture and may later be degraded so as to leave behind voids that may increase the conductivity of the fracture. Further, the non-degradable or degradable particulates, like the memory particulates, may be at least partially coated with the stabilizing agents described herein. In some embodiments, at least one or all of the memory particulates and the non-degradable and/or degradable particulates may be at least partially coated with the stabilizing agent(s). That is, not all of the particulates need to be coated, but in some embodiments they all may be.

Generally, the non-degradable and degradable particulates may be of any size and shape suitable for the memory particulates, as described herein. In some embodiments, it may be preferred that the non-degradable and/or degradable particulates are about the same size and shape of the memory particulates used in a particular application, particularly if they are used to form aggregates.

The non-degradable particulates for use in the embodiments described herein may be any material that does not degrade within subterranean formation conditions over a prolonged period of time (e.g., they may degrade after the estimated useful life of the formation) or upon prolonged contact with any fluids or components used in the formation. Suitable materials for these non-degradable particulates may include, but are not limited to, sand; bauxite; ceramic material; glass material; polymeric material (e.g., ethylene-vinyl acetate or composite materials); polytetrafluoroethylene material; nut shell pieces; a cured resinous particulate comprising nut shell pieces; seed shell pieces; a cured resinous particulate comprising seed shell pieces; fruit pit pieces; a cured resinous particulate comprising fruit pit pieces; wood; composite particulates; and any combination thereof. Suitable composite particulates may comprise a binder and a filler material, wherein suitable filler materials may include, but are not limited to, silica; alumina; fumed carbon; carbon black; graphite; mica; titanium dioxide; barite; meta-silicate; calcium silicate; kaolin; talc; zirconia; boron; fly ash; hollow glass microspheres; solid glass; and any combination thereof.

The degradable particulates for use in the embodiments described herein may be any degradable material capable of degrading over time or under certain conditions (e.g., temperature, pH, and the like). Suitable examples of degradable particulates that may be used in accordance with the present disclosure may include, but are not limited to, a polysaccharide (e.g., dextran or cellulose); a chitin; a chitosan; a protein; an aliphatic polyester; a poly(lactide); a poly(glycolide); a poly(ε-caprolactone); a poly(hydroxybutyrate); a poly(anhydride); an aliphatic polycarbonate; an aromatic polycarbonate; a poly(orthoester); a poly(amino acid); a poly(ethylene oxide); a polyphosphazenes; and any combination thereof. Of these suitable degradable particulates, aliphatic polyesters and polyanhydrides may be preferred. Polyanhydride hydrolysis may proceed, in situ, via free carboxylic acid chain-ends to yield carboxylic acids as final degradation products. The degradation time can be varied over a broad range by changes in the polymer backbone. Examples of suitable polyanhydrides may include, but are not limited to, poly(adipic anhydride), poly(suberic anhydride), poly(sebacic anhydride), and poly(dodecanedioic anhydride). Other suitable examples may include, but are not limited to, poly(maleic anhydride) and poly(benzoic anhydride).

Dehydrated salts may be used in accordance with the embodiments of the present disclosure as a degradable material for forming the degradable particulates. A dehydrated salt may be suitable for use in the embodiments described herein if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. Other examples include organic or inorganic salts like acetate trihydrate.

In some embodiments, the degradable material used for forming the degradable particulates for use in some embodiments described herein may include oil-degradable polymers. Suitable oil-degradable polymers may include, but are not limited to, polyacrylics, polyamides, and polyolefins such as polyethylene, polypropylene, polyisobutylene, and polystyrene. Other suitable oil-degradable polymers include those that have a melting point which is such that the polymer will dissolve at the temperature of the subterranean formation in which it is placed such as a wax material.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide.

In choosing the appropriate degradable material, one should consider the degradation products that will result. These degradation products should not adversely affect other operations or components and may even be selected to improve the long-term performance and/or conductivity of the subterranean formation. The choice of degradable material also may depend, at least in part, on the conditions of the formation (e.g., temperature). For instance, lactides have been found to be suitable for lower temperature formations, including those within the range of 60° F. (15.6° C.) to 150° F. (65.6° C.), and polylactides have been found to be suitable for formation temperatures above this range. Also, poly (lactic acid) may be suitable for higher temperature formations. Some stereoisomers of poly(lactide) or mixtures of such stereoisomers may be suitable for even higher temperature applications.

In some embodiments, a preferable result is achieved if the degradable material degrades slowly over time as opposed to instantaneously. The slow degradation of the degradable material, in situ, may help to ensure that the fracture is stable after the hydraulic pressure is removed.

The treatment fluid and the spacer fluid may each comprise a treatment base fluid and a spacer base fluid, respectively. Both the treatment base fluid and the spacer base fluid are referred to herein collectively as "base fluids." In those embodiments where a pad fluids is used, it may comprise a pad base fluid, which may also be referred to herein as a "base fluid." The base fluid selected for use in the embodiments herein may be any base fluid capable for use in a subterranean formation including, but not limited to, oil base fluids, aqueous base fluids, aqueous-miscible base fluids, water-in-oil emulsion base fluids, or oil-in-water emulsion base fluids.

Suitable oil base fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous base fluids may include, but are not limited to, fresh water, saltwater (e.g., water containing one or more salts dissolved therein), brine (e.g., saturated salt water), seawater, and any combination thereof. Suitable aqueous-miscible base fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid, and any combination thereof. Suitable water-in-oil emulsion base fluids, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous miscible base fluid.

In some embodiments, the treatment fluids and/or spacer fluids (and, if included, pad fluids) may further comprise an additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a lost circulation material, a foaming agent, a gas, a pH control additive, a breaker, a biocide, a crosslinker, a stabilizer, a chelating agent, a scale inhibitor, a gas hydrate inhibitor, an oxidizer, a reducer, a friction reducer, a clay stabilizing agent, and any combination thereof.

In various embodiments, systems configured for delivering the treatment fluids and/or the spacer fluids (and/or any pad fluids, if included), collectively referred to simply as "fluids" as follows and with reference to FIG. 1, described herein to a downhole location are described. In various embodiments, the systems can comprise a pump fluidly coupled to a tubular, the tubular containing the fluids described herein. It will be appreciated that while the system described below may be used for delivering any of the fluids described herein, each fluid may be delivered by other means into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluids to a subterranean formation at or above a fracture gradient of the subterranean formation, but it may also be used in cases where fracturing is not desired. In some embodiments, the high pressure pump may be capable of fluidly conveying particulate matter, such as the memory particulates, the non-degradable non-expandable particulates, and/or the degradable non-expandable particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluids to the high pressure pump. In such embodiments, the low pressure pump may "step up" the pressure of the fluids before reaching the high pressure pump.

In some embodiments, the systems described herein can further comprise a mixing tank that is upstream of the pump and in which the fluids are formulated. In various embodiments, the pump (e.g., a low pressure pump, a high pressure pump, or a combination thereof) may convey the fluids from the mixing tank or other source of the fluids to the tubular. In other embodiments, however, the fluids may be formulated offsite and transported to a worksite, in which case the fluid may be introduced to the tubular via the pump directly from its shipping container (e.g., a truck, a railcar, a barge, or the like) or from a transport pipeline. In either case, the fluids may be drawn into the pump, elevated to an appropriate pressure, and then introduced into the tubular for delivery downhole.

FIG. 1 shows an illustrative schematic of a system that can deliver the fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the fluid may, in some embodiments, flow back to wellhead 14 and exit subterranean formation 18. In some embodiments, the fluid that has flowed back to wellhead 14 may subsequently be recovered and recirculated to subterranean formation 18.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing memory particulates having a compressed configuration and a decompressed configuration; providing a treatment fluid comprising a treatment base fluid and memory particulates in a configuration; introducing the treatment fluid into a subterranean formation comprising at least one fracture therein, so as to place the memory particulates in the at least one fracture in their compressed configuration; and expanding the memory particulates to the decompressed configuration, thereby mechanically interlocking the memory particulates and propping open at least a portion of the at least one fracture.

B. A method comprising: providing memory particulates having a compressed configuration and a decompressed configuration; providing a substantially solids-free spacer fluid comprising a spacer base fluid; providing a treatment fluid comprising a treatment base fluid and memory particulates in the compressed configuration; intermittently introducing the spacer fluid and the treatment fluid into a subterranean formation comprising at least one fracture therein so as to alternate the memory particulates in the compressed configuration and the spacer fluid within the at least one fracture; and expanding the memory particulates to the decompressed configuration, thereby mechanically interlocking the memory particulates and propping open at least a portion of the at least one fracture.

Each of embodiments A and B may have one or more of the following additional elements in any combination:

Element 1: Wherein at least a portion of the memory particulates in the compressed configuration are coated with a stabilizing agent.

Element 2: Wherein the treatment fluid further comprises a stabilizing agent.

Element 3: Wherein the memory particulates are at least partially encased in a gel body.

Element 4: Wherein the treatment fluid further comprises at least one of a degradable non-expandable particulate and a non-degradable non-expandable particulate.

Element 5: Wherein the treatment fluid further comprises at least one of a degradable non-expandable particulate and a non-degradable non-expandable particulate, and at least one of the degradable non-expandable particulates and the non-degradable non-expandable particulates is coated with a stabilizing agent.

Element 6: Wherein the memory particulates comprise a martensitic ceramic.

Element 7: Wherein the memory particulates comprise a martensitic ceramic, the ceramic selected from the group consisting of an oxide ceramic, a boride ceramic, a nitride ceramic, a silicate ceramic, and any combination thereof.

Element 8: Wherein at least a portion of the memory particulates comprises at least one of a superelastic alloy and a swellable elastomer.

Element 9: Wherein the compressed configuration of the memory particulates is achieved by exposing the memory particulates to a temperature less than about 45° C.

Element 10: Wherein the treatment fluid is introduced into the subterranean formation using at least one of a high pressure pump and a low pressure pump.

Element 11: Wherein the spacer fluid is introduced into the subterranean formation at a rate and pressure sufficient to create or enhance the at least one fracture therein.

By way of non-limiting example, exemplary combinations applicable to A and B include: A with 1 and 5; A with 6, 8, and 10; B with 7, 9, and 11; B with 3, 4, and 10.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   providing memory particulates capable of having a compressed configuration and a decompressed configuration;
   providing a treatment fluid comprising a treatment base fluid and the memory particulates in a compressed configuration;
   introducing the treatment fluid into a subterranean formation comprising at least one fracture therein, so as to place the memory particulates in the at least one fracture in their compressed configuration; and
   expanding the memory particulates to the decompressed configuration, thereby mechanically interlocking the memory particulates and propping open at least a portion of the at least one fracture,
      wherein the memory particulates comprise a martensitic ceramic selected from the group consisting of an oxide ceramic, a boride ceramic, a nitride ceramic, a silicate ceramic, and any combination thereof, and
      wherein at least a portion of the memory particulates comprises at least one of superelastic alloy or a swellable elastomer.

2. The method of claim 1, wherein at least a portion of the memory particulates in the compressed configuration are coated with a stabilizing agent.

3. The method of claim 1, wherein the treatment fluid further comprises a stabilizing agent.

4. The method of claim 1, wherein the memory particulates are at least partially encased in a gel body.

5. The method of claim 1, wherein the treatment fluid further comprises at least one of a degradable non-expandable particulate and a non-degradable non-expandable particulate.

6. The method of claim 5, wherein at least one of the degradable non-expandable particulates and the non-degradable non-expandable particulates is coated with a stabilizing agent.

7. The method of claim 1, wherein the memory particulates comprises the superelastic alloy and the swellable elastomer and wherein the swellable elastomer is one selected from the group consisting of a cross-linked polyacrylamide; a cross-linked polyacrylate; a cross-linked copolymer of acrylamide and acrylate monomers; a starch grafted with acrylonitrile and acrylate; a cross-linked polymer of two or more of allylsulfonates; a 2-acrylamido-2-methyl-1-propanesulfonic acid; a 3-allyloxy-2-hydroxy-1- propanesulfonic acid; an acrylamide; an acrylic acid monomer; a salt of a carboxyl starch; a salt of a carboxymethyl starch; a salt of carboxymethyl cellulose; a salt of cross-linked carboxyalkyl polysaccharide; a natural rubber; an acrylate butadiene rubber; a polyacrylate rubber; an isoprene rubber; a chloroprene rubber; a butyl rubber; a brominated butyl rubber; a chlorinated butyl rubber; a chlorinated polyethylene; a neoprene rubber; a styrene butadiene copolymer rubber, a sulphonated polyethylene; an ethylene acrylate rubber; an epichlorohydrin ethylene oxide copolymer; an ethylene-propylene rubber; an ethylene-propylene-diene terpolymer rubber; an ethylene vinyl acetate copolymer; a fluorosilicone rubber; a silicone rubber; a fluoro rubber; a poly 2,2,1-bicyclo heptane; an alkylstyrene; a crosslinked substituted vinyl acrylate copolymer; and any combination thereof.

8. The method of claim 1, wherein the compressed configuration of the memory particulates is achieved by exposing the memory particulates to a temperature less than about 45° C.

9. The method of claim 1, wherein the treatment fluid is introduced into the subterranean formation using at least one of a high pressure pump and a low pressure pump.

10. A method comprising:
providing memory particulates capable of having a compressed configuration and a decompressed configuration;
providing a substantially solids-free spacer fluid comprising a spacer base fluid;
providing a treatment fluid comprising a treatment base fluid and the memory particulates in the compressed configuration;
intermittently introducing the spacer fluid and the treatment fluid into a subterranean formation comprising at least one fracture therein so as to alternate the memory particulates in the compressed configuration and the spacer fluid within the at least one fracture; and
expanding the memory particulates to the decompressed configuration, thereby mechanically interlocking the memory particulates and propping open at least a portion of the at least one fracture,
wherein the memory particulates comprise a martensitic ceramic selected from the group consisting of an oxide ceramic, a boride ceramic, a nitride ceramic, a silicate ceramic, and any combination thereof, and
wherein at least a portion of the memory particulates comprises at least one of superelastic alloy or a swellable elastomer.

11. The method of claim 10, wherein the spacer fluid is introduced into the subterranean formation at a rate and pressure sufficient to create or enhance the at least one fracture therein.

12. The method of claim 10, wherein at least a portion of the memory particulates in the compressed configuration are coated with a stabilizing agent.

13. The method of claim 10, wherein the treatment fluid further comprises a stabilizing agent.

14. The method of claim 10, wherein the memory particulates are at least partially encased in a gel body.

15. The method of claim 10, wherein the treatment fluid further comprises at least one of a degradable non-expandable particulate and a non-degradable non-expandable particulate.

16. The method of claim 15, wherein at least one of the degradable non-expandable particulates and the non-degradable non-expandable particulates is coated with a stabilizing agent.

\* \* \* \* \*